May 13, 1958
A. E. CHUTE ET AL
2,834,655
PRODUCTION OF ELEMENTAL SULFUR
Filed Sept. 9, 1955
2 Sheets-Sheet 1
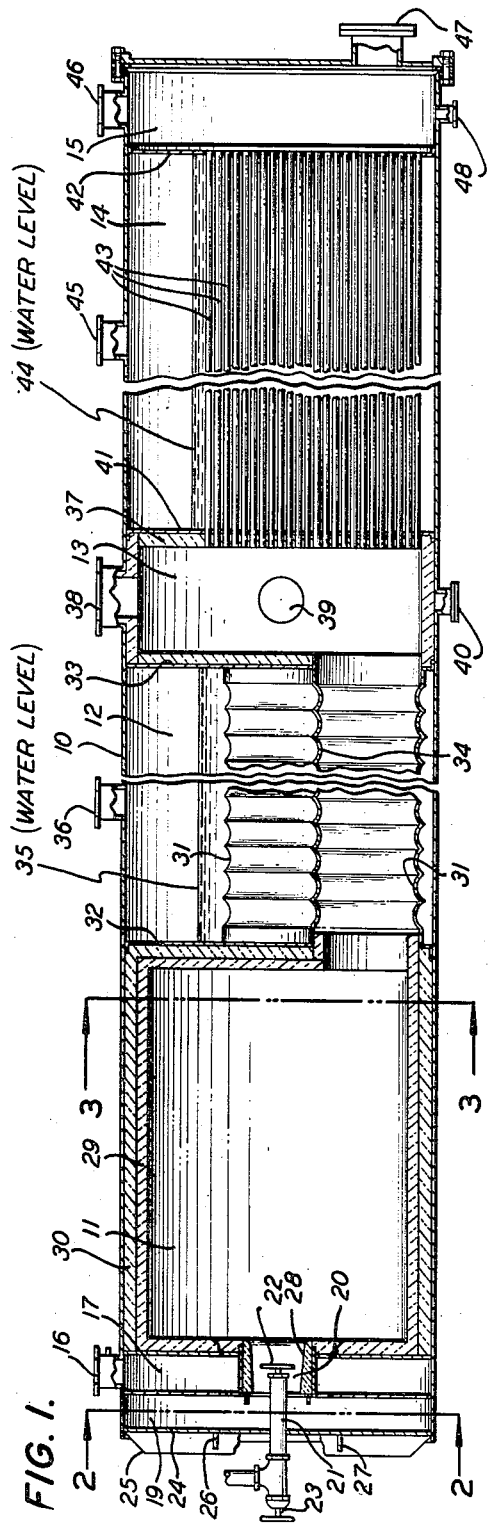
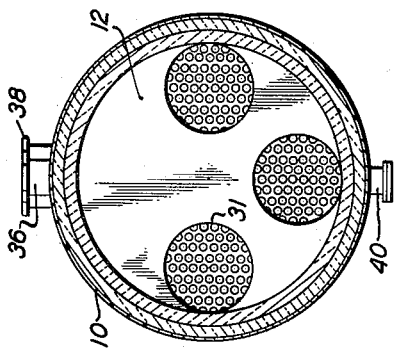
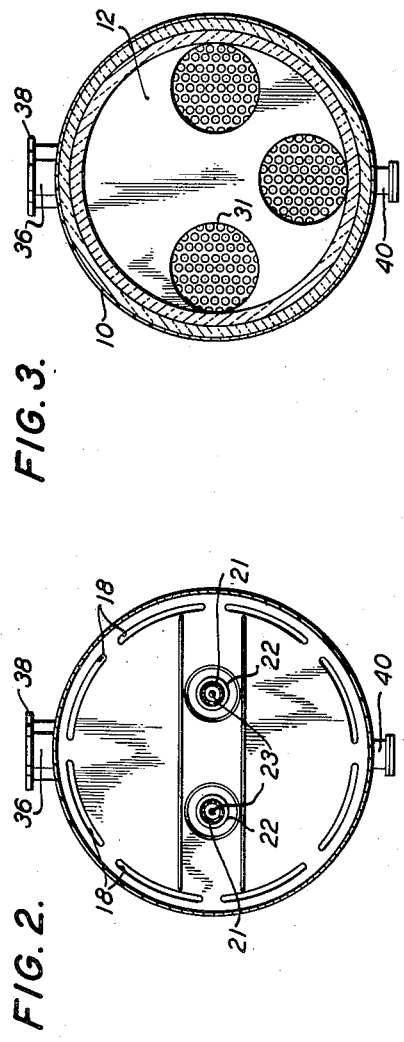
ANDREW E. CHUTE
GEORGE E. SMALLEY
JAMES W. KLOHR
BLAIR G. ALDRIDGE
INVENTORS.
BY
Christie, Parker & Hale
ATTORNEYS May 13, 1958  A. E. CHUTE ET AL  2,834,655
PRODUCTION OF ELEMENTAL SULFUR
Filed Sept. 9, 1955  2 Sheets-Sheet 2

ANDREW E. CHUTE
GEORGE E. SMALLEY
JAMES W. KLOHR
BLAIR G. ALDRIDGE
INVENTORS.

BY
Christie, Parker & Hale
ATTORNEYS

United States Patent Office 2,834,655
Patented May 13, 1958

2,834,655
PRODUCTION OF ELEMENTAL SULFUR

Andrew E. Chute, South Pasadena, George E. Smalley, Arcadia, James W. Klohr, Whittier, and Blair G. Aldridge, Los Angeles, Calif., assignors to The Ralph M. Parsons Company, Los Angeles, Calif., a corporation of Nevada Application September 9, 1955, Serial No. 533,283

11 Claims. (Cl. 23—277)

This invention is concerned with the production of elemental sulfur from gas containing hydrogen sulfide. It provides a novel reaction furnace which facilitates such production, especially in large scale operations.

Hydrogen sulfide is recovered in oil and gas fields and petroleum refineries from hydrocarbon streams, and the recovered hydrogen sulfide may be converted to elemental sulfur, thus making a poisonous nuisance into a saleable product. In one widely used process, part of the hydrogen sulfide of a gas stream (say a third) is burned in a restricted supply of air to produce sulfur dioxide according to the reaction:

(1) 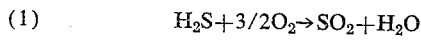$$H_2S + 3/2 O_2 \rightarrow SO_2 + H_2O$$

The sulfur dioxide thus formed is reacted with residual hydrogen sulfide of the gas stream to produce elemental sulfur, according to the reaction:

(2) $$2H_2S + SO_2 \rightarrow 3S + 2H_2O$$

Both reactions are exothermic and tend to reverse at high temperatures.

The first reaction ordinarily takes place in a furnace. The second reaction may take place partly in the furnace or entirely in one or more converters which follow the furnace (and which contain catalyst) depending upon the proportion of the gas stream that is by-passed around the furnace. It is desirable to conduct as much of the second reaction as possible in the furnace, where it is easier to control than in the converters. In accordance with our invention, we provide a reaction furnace in which a large proportion of the second reaction may occur, with the result that an increased proportion of the total sulfur may be formed immediately without the aid of catalyst.

Our new reaction furnace has general application, irrespective of the amount and concentration of hydrogen sulfide, but finds its greatest application in situations where the quantity of hydrogen sulfide to be converted is great.

In summary, the reaction furnace of our invention comprises an elongated drum of substantially uniform cross section disposed on its side and having a plurality of sections, each extending across the drum transverse to its longitudinal and approximately horizontal axis. The first section is a combustion chamber for the hydrogen sulfide and is located at the front of the drum. This is followed by a water jacket through which pass a relatively few tubes or tunnels (say three or four) of large cross section spaced from each other and extending longitudinally of the drum and opening at one end into the combustion chamber. A first chamber into which the opposite ends of the tubes of the first water jacket open is disposed following the first water jacket, and this is followed in turn by a second water jacket through which pass a relatively large number of tubes (say several hundred) spaced from each other and extending longitudinally and opening at their front end into the first chamber. The opposite ends of the tubes of the second water jacket open into a second chamber, from which residual gases may pass through a conduit to a conventional converter, say one provided with a catalyst to further the reaction of residual $H_2S$ with residual $SO_2$. Means are provided for introducing the hydrogen sulfide and an oxygen-containing gas into the combustion chamber. The latter, as well as the two water jackets, are substantially longer than the first and second chambers.

Preferably the reaction furnace of the invention is tipped slightly (say 1 inch in 10 feet) toward the rear, so that sulfur formed and condensed in any section will drain into the second or rear chamber, from which it may be withdrawn in molten state through a pipe.

In the operation of the apparatus, steam is generated in both water jackets. This steam may be permitted to evolve into space in the upper portion of the jackets, but this reduces the space available for tubes in both jackets and thus reduces capacity. By way of example, when the apparatus is designed to permit steam to occupy space in the top of the first jacket, the number of tubes or tunnels passing through this jacket may be reduced by one or two, with a corresponding reduction in the proportion of tubes in the second jacket. To avoid this reduction, the apparatus may be provided with a steam drum disposed above the jackets and connected to one or both of them, so that the steam evolves from a water surface in this drum and the jackets remain full of water at all times.

If desired, two of the reaction furnaces of our invention may be connected in parallel in the process and provided with a common steam drum.

These and other aspects of our invention will be clearly understood from the following detailed description of presently preferred examples, the description being illustrated by the accompanying drawings in which:

Fig. 1 is a fragmentary longitudinal sectional elevation through one form of the reaction furnace of our invention designed to permit steam to evolve and collect in the tops of the water jackets;

Fig. 2 is a section through the front end of the apparatus of Fig. 1 taken along the line 2—2;

Fig. 3 is a section taken through the first water jacket of the apparatus of Fig. 1 along the line 3—3;

Figure 4:
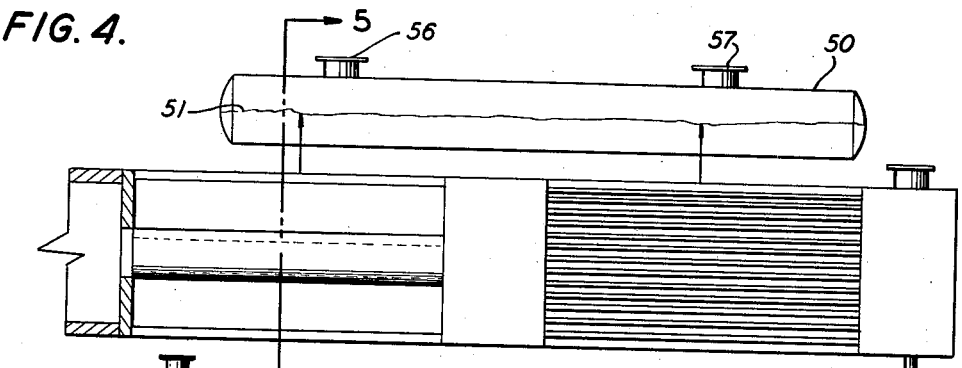
Fig. 4 is a diagrammatic longitudinal section of another form of the apparatus of our invention provided with a steam drum.

The apparatus of Figs. 1, 2 and 3 is enclosed in a long cylindrical steel shell or drum 10 which is disposed almost horizontally, but tilts slightly toward the rear on a slope of about 1 inch in 11 feet. The drum is divided into four principal sections—a combustion chamber 11 followed by a first water jacket section 12, a first open chamber 13, a second water jacket section 14, and a second open chamber 15. Air at low pressures and in controlled amounts for the combustion of hydrogen sulfide is admitted through a pipe 16 into an inlet chamber 17 disposed in the drum immediately in front of the combustion chamber. From the inlet chamber the air flows through circumferential slots 18 into a plenum chamber 19 at the extreme front of the drum. The plenum chamber opens into two burner throats 20, which pass through the inlet chamber (and are sealed therefrom) into the combustion chamber. Hydrogen sulfide is admitted into the burner throats through two burners 21 in the form of concentric pipes projecting partly into the burner throats, each burner being provided with a control baffle 22 on the end of a rod 23 which is adjustable longitudinally. The front plate 24 of the drum, which constitutes one wall of the plenum chamber, is externally reinforced by a vertical member 25 and horizontal members 26, 27.

The burner throat is lined with refractory tile 28. The combustion chamber is likewise lined with fire brick 29 with a layer 30 of insulating brick between the fire brick and the shell of the drum.

The first water jacket is provided with three large tubes or tunnels 31 spaced from each other and passing longitudinally through the water jacket from a front tube sheet 32 to a rear tube sheet 33 into which they are sealed. All three of the large tubes or tunnels are designed to resist relatively high pressure, say 400 pounds per square inch, and may be heavy wall, corrugated as shown at 34, or externally reinforced. There is no tube in the upper portion of the first water jacket, because this portion is reserved for steam disengagement. Thus a pool of water is maintained in the jacket up to the level 35, the space above the water level being provided for steam disengagement. Steam formed in the first water jacket is withdrawn through an upwardly projecting nozzle 36.

The rear ends of the three large tubes open through the tube sheet into the first open chamber 13, which is lined with refractory 37. This chamber is provided with an upper explosion vent 38 of conventional construction, a side manhole 39 likewise of conventional construction, and a clean-out connection 40 at the bottom of the drum. This clean-out connection is for emergency use and is provided with a flange and covered by the refractory within the chamber.

The rear end of the first open chamber is formed by a tube sheet 41 that extends across the drum and also forms the front end of the second water jacket, the rear end of this water jacket being formed by another tube sheet 42. A large number (say several hundred) tubes 43 of relatively small diameter (say 2 to 4 inches) extend from the first open chamber through the front and rear tube sheets of the water jacket. These tubes are sealed in the tube sheets and open into the second open chamber. They are disposed in about the lower three quarters of the water jacket, the water being maintained in this jacket up to a level 44 with a steam disengaging space above the water level, steam being removed from the second water jacket through a top outlet 45.

The second open chamber has a gas outlet pipe 46 at the top, a flanged manhole 47 on its rear end, and a drainpipe 48 for molten sulfur at its bottom.

In operation, gas containing hydrogen sulfide is admitted into the burner throats and there mixed with low pressure air from the plenum chamber. The gas mixture then passes through the combustion chamber, the large tubes of the first water jacket, the first chamber, the small tubes of the second water jacket, and the second chamber to the exhaust pipe on the rear of the reaction furnace. As soon as sulfur dioxide is formed by the reaction of the hydrogen sulfide with the oxygen of the air it begins to react with excess $H_2S$ admitted through the burners, to form elemental sulfur. Sulfur begins to collect in the first open chamber and in substantial quantities in the interior of the small tubes passing through the second water jacket from whence it drains in the second open chamber at the rear of the drum and is removed from this chamber through the drain 48. Unreacted $SO_2$, $H_2S$ and residual nitrogen from the air are withdrawn in admixture with each other continuously from the exhaust pipe 46 at the top of the second open chamber and passed to a conventional converter, not shown, where additional $H_2S$ may be admitted, if desired, from a by-pass around the furnace reactor.

In one practical example of the apparatus of Figs. 1, 2 and 3, the drum has an overall length of about 60 feet and a diameter of 12 feet. The combustion chamber is about 16 feet long; the water jackets are each 16 feet long; the first open chamber is 5 feet long; and the second open chamber is 4 feet long. The three large tubes in the first water jacket are about 40 inches in diameter; and there are about six hundred tubes with outside diameters of 3 inches in the second water jacket. The two water jackets are designed to withstand an internal pressure of 200 pounds per square inch and the combustion chamber and the two open chambers are designed to withstand an internal pressure of 12 pounds per square inch.

The foregoing apparatus is designed to treat about 200,000 standard cubic feet per hour (measured at atmospheric temperature and pressure) containing 83% by volume of $H_2S$, with the production of about 9,000 pounds of sulfur per hour in the reaction furnace proper.

Figure 5:
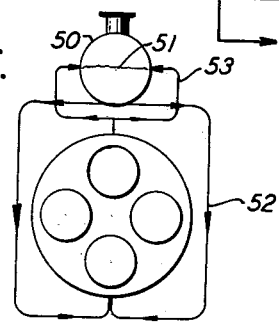
Fig. 5 is a diagrammatic cross section of the apparatus of Fig. 4 taken along the line 5—5 through the first water jacket.

The apparatus of Figs. 4 and 5 is essentially the same as the apparatus of Figs. 1, 2 and 3, with the following exceptions:

A. It is provided with a steam disengaging drum 50 disposed above the reaction furnace proper and in line therewith;

B. Both water jackets are completely full of water, the surface 51 of the top of the pool being within the disengaging drum;

C. The first jacket is provided with four large tubes or tunnels instead of three as in the case of the apparatus of Figs. 1, 2 and 3, installation of the additional tube being possible because the first water jacket is entirely full of water;

D. The second water jacket is likewise full of tubes and contains approximately a quarter more tubes than the second water jacket of Figs. 1, 2 and 3. Here again the jacket is entirely full of water so that the extra tubes may be employed;

E. The steam drum is connected to the first water jacket as shown in Fig. 5 by piping 52 which permits water from the bottom of the steam disengaging drum to circulate down into the bottom of the first water jacket while a second set of piping 53 permits water from the upper portion of the first water jacket to circulate into an upper portion of the steam disengaging drum adjacent the water level therein;

F. The second water jacket is connected to the steam disengaging drum in the same manner by lower and upper piping (not shown);

G. Steam produced in the apparatus of Figs. 4 and 5 is withdrawn through two steam outlets 56, 57 respectively at the front and rear of the steam disengaging drum.

Due to the increased aggregate cross sectional area of the tubes in both the first and second water jackets the apparatus of Figs. 4 and 5 has increased capacity in terms of sulfur products.

Figure 6:
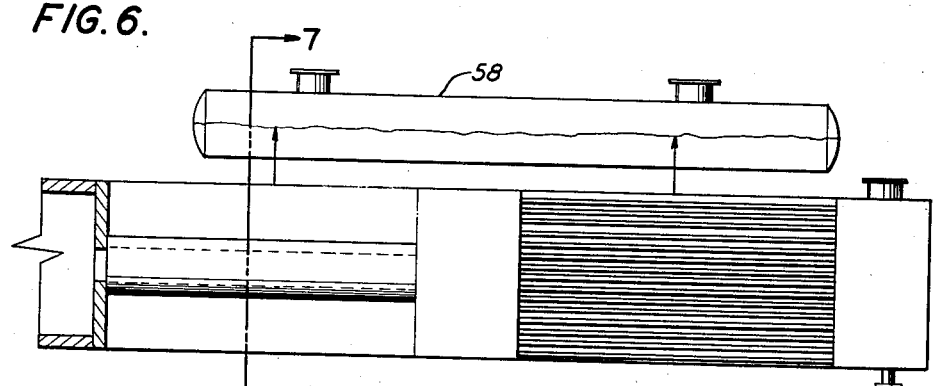
Fig. 6 is a diagrammatic longitudinal section taken through one of a pair of reaction furnaces of the invention arranged in parallel with a common steam drum.
Figure 7:
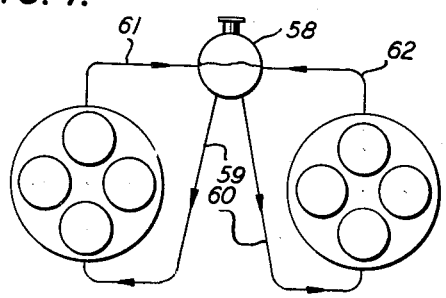
Fig. 7 is a diagrammatic cross section taken along the line 7—7 through the first water jackets of the two reaction furnaces of the apparatus of Fig. 6.

The apparatus of Figs. 6 and 7 is similar to that of Figs. 4 and 5, with the following exceptions:

A. The reaction furnaces are disposed side by side and in parallel as far as the gas stream is concerned but with a common steam disengaging drum for the first water jackets of the two units, this steam disengaging drum 58 being disposed above and between the respective first water jackets, with pipes 59, 60 connecting the bottom of the steam disengaging drum to the bottom of the respective jackets and with pipes 61, 62 connecting the top of the respective first water jackets to the upper portion of the steam disengaging drum.

B. The rear water jackets of the apparatus of Figs. 6 and 7 are connected to the steam drum in precisely the same fashion as the front jackets.

The process conducted in the various forms of the apparatus described here basically involves burning one-third of the hydrogen sulfide in a gas stream to sulfur dioxide and then reacting the sulfur dioxide thus formed with two-thirds of the hydrogen sulfide to form sulfur and water vapor. If desired, the furnace reactor may be employed solely for the production of $SO_2$ in which case a maximum of two-thirds of the hydrogen sulfide may be by-passed around the reaction furnace. This, however, is not always a desirable practice, for it means that the reaction between the sulfur dioxide and the hydrogen sulfide takes place entirely in a converter (not shown) following the reaction furnace under conditions in which it is difficult to control the temperature of the reaction and prevent its reversal at high temperature. It is preferable to admit more than one-third of the total hydrogen sulfide, together with enough oxygen to burn one-third of the total hydrogen sulfide, into the combustion chamber. Then as sulfur dioxide is formed it will react at least in part with the excess hydrogen sulfide in the reaction furnace to produce elemental sulfur directly under temperature conditions which are held stable by the water jackets.

As the gases are passed through the large tubes in the first water jacket they are cooled largely by radiation, the heat of reaction being employed to produce useful steam. In the second water jacket the hot gas stream is cooled largely by convection, with the same result. The reaction between the hydrogen sulfide and the sulfur dioxide to produce sulfur and water vapor is stable when quickly quenched and this quick quenching is assured by the two water jackets.

In addition to the advantage of quick quenching which is assured in our reaction furnace, with consequent increase in the proportion of elemental sulphur produced therein, the furnace reactor of our invention has a further advantage in that it may be constructed in very large sizes and transported on regular railroad cars to the construction site. If desired, the two water jackets may be made separately and conveyed separately to the construction site and there welded together end to end at the first open chamber. In this way a sulfur recovery apparatus with capacity several times that available heretofore may be constructed at a distance and easily conveyed to and erected at the plant site.

We claim:

1. In apparatus for producing elemental sulfur from gaseous hydrogen sulfide by burning part of the hydrogen sulfide to form sulfur dioxide and reacting this sulfur dioxide with remaining hydrogen sulfide, an elongated drum of substantially uniform cross section disposed on its side and enclosing a plurality of successive portions each extending across the drum and comprising a combustion chamber for the hydrogen sulfide at the front of the drum, a first water jacket following the combustion chamber and provided with a relatively few tubes of large cross section spaced from each other and extending longitudinally of the drum through the jacket and opening at one end into the combustion chamber, a first open chamber immediately following the first water jacket with the other end of the tubes of large cross section opening thereinto, a second water jacket following the first open chamber and provided with relatively numerous tubes of small cross section spaced from each other and extending longitudinally of the drum through the second water jacket and opening at one end into the first open chamber, and a second open chamber following the second water jacket with the tubes of small cross section opening thereinto at their opposite end, a conduit connected to and opening into the bottom of the second open chamber for draining elemental sulfur therefrom, a vapor outlet conduit connected to an upper portion of the second open chamber, the drum being provided with means for introducing the hydrogen sulfide and an oxygen-containing gas into the combustion chamber, and the combustion chamber and the two water jackets each being substantially longer than said first and second chambers.

2. In apparatus for producing elemental sulfur from gaseous hydrogen sulfide by burning part of the hydrogen sulfide to form sulfur dioxide and reacting this sulfur dioxide with remaining hydrogen sulfide, an elongated drum of substantially uniform cross section disposed on its side and tilted slightly toward the rear and having a plurality of successive portions each extending across the drum and comprising a combustion chamber for the hydrogen sulfide at the front of the drum, a first water jacket following the combustion chamber and provided with a relatively few tubes of large cross section spaced from each other and extending longitudinally of the drum through the jacket and opening at one end into the combustion chamber, a first open chamber immediately following the first water jacket with the other end of the tubes of large cross section opening thereinto, a second water jacket following the first open chamber and provided with relatively numerous tubes of small cross section spaced from each other and extending longitudinally of the drum through the second water jacket and opening at one end into the first open chamber, a second open chamber following the second water jacket with the tubes of small cross section opening thereinto at their opposite end, a conduit connected to and opening into the bottom of the second open chamber for draining elemental sulfur therefrom, a vapor outlet conduit connected to an upper portion of the second open chamber, the drum being provided with means for introducing into the combustion chamber an oxygen-containing gas and the hydrogen sulfide in excess of that required to react with the oxygen of said gas to produce the sulfur dioxide, and the combustion chamber and the two water jackets each being substantially longer than said first and second chambers.

3. In apparatus for producing elemental sulfur from gaseous hydrogen sulfide by burning part of the hydrogen sulfide to form sulfur dioxide and reacting this sulfur dioxide with remaining hydrogen sulfide, an elongated drum of substantially uniform cross section disposed on its side and having a plurality of successive portions each extending across the drum and comprising a combustion chamber for the hydrogen sulfide at the front of the drum, a first water jacket following the combustion chamber and provided with a relatively few tubes of large cross section spaced from each other and extending longitudinally of the drum through the jacket and opening at one end into the combustion chamber, a first open chamber immediately following the first water jacket with the other end of the tubes of large cross section opening thereinto, a second water jacket following the first open chamber and provided with relatively numerous tubes of small cross section spaced from each other and extending longitudinally of the drum through the second water jacket and opening at one end into the first open chamber, a second open chamber following the second water jacket with the tubes of small cross section opening thereinto at their opposite end, a steam drum disposed above the elongated drum and connected to at least one of the water jackets, a steam outlet conduit connected to the steam drum, a conduit connected to and opening into the bottom of the second open chamber for draining elemental sulfur therefrom, a vapor outlet conduit connected to an upper portion of the second open chamber, the drum being provided with means for introducing an oxygen-containing gas and the hydrogen sufide into the combustion chamber, and the combustion chamber and the two water jackets each being substantially longer than said first and second chambers.

4. In apparatus for producing elemental sulfur from gaseous hydrogen sulfide by burning part of the hydrogen sulfide to form sulfur dioxide and reacting this sulfur dioxide with remaining hydrogen sulfide, an elongated drum of substantially uniform cross section disposed on its side and having a plurality of successive portions each extending across the drum and comprising a combustion chamber for the hydrogen sulfide at the front of the drum, a first water jacket following the combustion chamber and provided with a relatively few tubes of large cross section spaced from each other and extending longitudinally of the drum through the jacket and opening at one end into the combustion chamber, a first open chamber immediately following the first water jacket with the other end of the tubes of large cross section opening thereinto, a second water jacket following the first open chamber and provided with relatively numerous tubes of small cross section spaced from each other and extending longitudinally of the drum through the second water jacket and opening at one end into the first open chamber, and a second open chamber following the second water jacket with the tubes of small cross section opening thereinto at their opposite end, a conduit connected to and opening into the bottom of the second open chamber for draining elemental sulfur therefrom, and a vapor outlet conduit connected to an upper portion of the second open chamber, a steam outlet conduit connected to the top of the first water jacket, and a steam outlet conduit connected to the top of the second water jacket, the elongated drum being provided with means for introducing an oxygen-containing gas and the hydrogen sulfide into the combustion chamber, and the combustion chamber and the two water jackets each being substantially longer than said first and second chambers.

5. Apparatus according to claim 4 in which the upper portions of the first and second water jackets are free of tubes so as to leave spaces for the collection of steam in both jackets.

6. In apparatus for producing elemental sulfur from gaseous hydrogen sulfide by burning part of the hydrogen sulfide to form sulfur dioxide and reacting this sulfur dioxide with remaining hydrogen sulfide, an elongated drum of substantially uniform cross section disposed on its side and having a plurality of successive portions each extending across the drum and comprising a combustion chamber for the hydrogen sulfide at the front of the drum, a first water jacket following the combustion chamber and provided with a relatively few tubes of large diameter spaced from each other and extending longitudinally of the drum through the jacket and opening at one end into the combustion chamber, a first open chamber immediately following the first water jacket with the other end of the tubes of large cross diameter opening thereinto, a second water jacket following the first open chamber and provided with relatively numerous tubes of small diameter spaced from each other and extending longitudinally of the drum through the second water jacket and opening at one end into the first open chamber, and a second open chamber following the second water jacket with the tubes of small diameter opening thereinto at their opposite end, a conduit connected to and opening into the bottom of the second open chamber for draining elemental sulfur therefrom, a vapor outlet conduit connected to an upper portion of the second open chamber, and a steam drum disposed above the elongated drum, conduit means connecting the bottom of the steam drum to both an upper and a lower portion of the first water jacket, conduit means connecting the bottom of the steam drum to an upper portion of the second water jacket, and conduit means for introducing the hydrogen sulfide and an oxygen-containing gas into the combustion chamber, the combustion chamber and the two water jackets being substantially longer than said first and second open chambers.

7. In apparatus for producing elemental sulfur from gaseous hydrogen sulfide by burning part of the hydrogen sulfide to form sulfur dioxide and reacting this sulfur dioxide with remaining hydrogen sulfide, a plurality of elongated drums each of substantially uniform cross section disposed on their sides substantially parallel to each other, each drum having a plurality of successive portions each extending across that drum and comprising a combustion chamber for the hydrogen sulfide at the front of the drum, a first water jacket following the combustion chamber and provided with a relatively few tubes of large cross section spaced from each other and extending longitudinally of the drum through the jacket and opening at one end into the combustion chamber, a first open chamber immediately following the first water jacket with the other end of the tubes of large cross section opening thereinto, a second water jacket following the first open chamber and provided with relatively numerous tubes of small cross section spaced from each other and extending longitudinally of the drum through the second water jacket and opening at one end into the first open chamber, and a second open chamber following the second water jacket with the tubes of small cross section opening thereinto at their opposite end, a conduit connected to and opening into the bottom of the second open chamber for draining elemental sulfur therefrom, a vapor outlet conduit connected to an upper portion of the second open chamber, a steam drum disposed above the elongated drums and conduit means connecting the steam drum with at least one water jacket in each of the elongated drums and conduits for introducing hydrogen sulfide and an oxygen-containing gas into each of the combustion chambers, the latter and the water jackets each being substantially longer than said first and second open chambers.

8. Apparatus according to claim 7 having conduit means connecting the bottom of the steam drum to both upper and lower portions of the first water jackets in both of the elongated drums.

9. Apparatus according to claim 7 having conduit means connecting the bottom of the steam drum to both upper and lower portions of the second water jackets in both of the elongated drums.

10. Apparatus according to claim 7 having conduit means connecting the bottom of the steam drum to both upper and lower portions of the first water jackets in both elongated drums and to both upper and lower portions of the second water jackets in both elongated drums.

11. In apparatus for producing elemental sulfur from gaseous hydrogen sulfide by burning part of the hydrogen sulfide to form sulfur dioxide and reacting this sulfur dioxide with remaining hydrogen sulfide, an elongated drum of substantially uniform cross section disposed on its side and having a plurality of sections each extending across the drum and comprising a combustion chamber for the hydrogen sulfide at the front of the drum, a first water jacket following the combustion chamber and provided with a relatively few tubes of large cross section spaced from each other and extending longitudinally of the drum through the jacket and opening at one end into the combustion chamber, a first open chamber immediately following the first water jacket with the other end of the tubes of large cross section opening thereinto, a second water jacket following the first open chamber and provided with relatively numerous tubes of small cross section spaced from each other and extending longitudinally of the drum through the second water jacket and opening at one end into the first open chamber, and a second open chamber following the second water jacket with the tubes of small cross section opening thereinto at their opposite end, a conduit connected to and opening into the bottom of the second open chamber for draining elemental sulfur therefrom, a vapor outlet conduit connected to an upper portion of the second open chamber, and a steam drum disposed directly above both water jackets, conduit means connecting the steam drum to the second water jacket, and a steam outlet conduit from the top of the steam drum, the combustion chamber being provided with means for introducing thereto the hydrogen sulfide and an oxygen-containing gas, the combustion chambers and water jackets each being longer than said open chambers.

References Cited in the file of this patent

UNITED STATES PATENTS

| 192,165 | Hind | June 19, 1877 |
| 1,751,534 | Taylor | Mar. 1, 1930 |

OTHER REFERENCES

Fiat Report 1015, Office of Military Govt. for Germany (U. S.), Oxidation of $H_2S$ to Sulfur in Claus Ovens, Jan. 17, 1947, by Gordon A. Cain, Fig. 3.